T. A. KELLY.
REVERSIBLE SCISSORS.
No. 187,713. Patented Feb. 27, 1877.
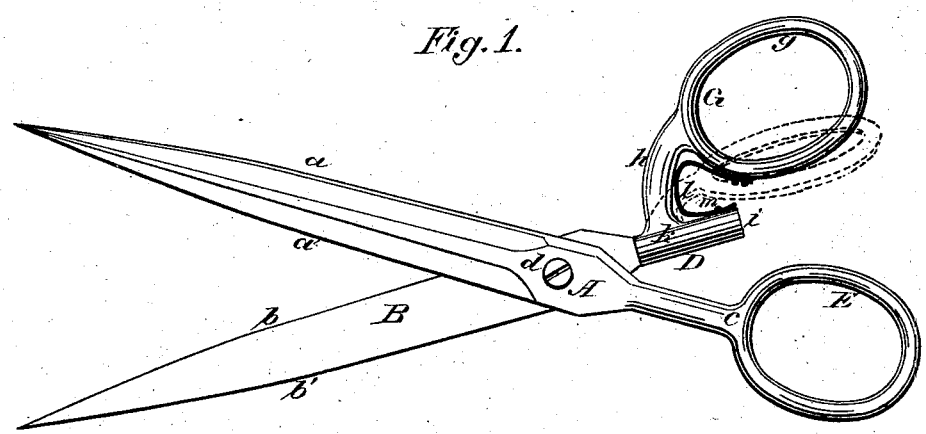
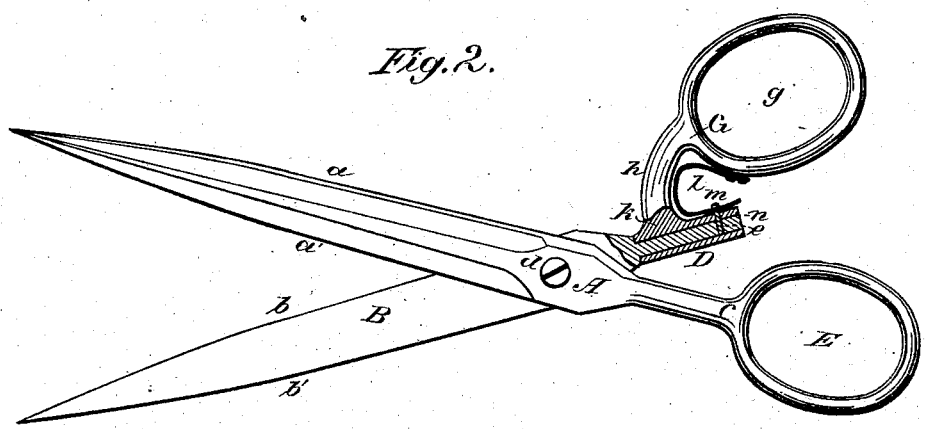

UNITED STATES PATENT OFFICE.

THOMAS A. KELLY, OF JACKSON, ALABAMA.

IMPROVEMENT IN REVERSIBLE SCISSORS.

Specification forming part of Letters Patent No. 187,713, dated February 27, 1877; application filed September 18, 1876.

*To all whom it may concern:*

Be it known that I, THOMAS A. KELLY, of Jackson, in the county of Clarke and State of Alabama, have invented certain new and useful Improvements in Reversible Scissors; and I do hereby declare that the following is a full, clear, and exact description thereof, which will enable others skilled in the art to which it appertains to make and use the same, reference being had to the accompanying drawing, which forms a part of this specification, and in which—

Figure 1 is a perspective view, the dotted lines indicating the position of the reversible handle while being turned, and Figure 2 is a horizontal section through the blade having the reversible handle.

Similar letters of reference indicate corresponding parts.

This invention relates to that class of scissors or shears which are provided with double cutting-edges, and in which, by reversing one of the handles, one pair of cutting-edges may be thrown into, and the other out of, operation; and it consists in the method of securing the said reversible handle in position by means of a pin operated by a spring in such a manner that when the pin is released the handle may be reversed without detaching it, as hereinafter more fully shown and described and definitely claimed.

In the drawing, A B are the blades of a pair of scissors, each provided with two cutting-edges, *a a' b b'*. The blades are riveted together in the usual manner at *d*. Both the blades have straight stems C D, but only one of them, A, has upon its stem C a solid eye or handle, E. The stem D upon the other blade, B, is preferably rounded off, so as to serve as a pivot for the reversible handle G. This consists of a handle or eye, *g*, having a curved stem, *h*, which expands so as to form a shank, *k*, perforated longitudinally, as shown at *i*. Upon the inside of the stem *h* is secured a curved steel-spring, *l*, having a projecting tooth, *m*, passing through a perforation, *n*, in the side of the perforated shank *k*. The stem D of blade B has on each side a notch, *e*, into which the tooth *m*, when the handle G is placed in position on stem D, sinks, thus keeping the handle securely in its proper place.

The method of adjusting handle G will be easily understood. It consists in simply sliding it upon stem D until tooth *m* sinks into notch *e*. When the operation of the scissors is to be reversed this is easily done by simply releasing tooth *m*, (the spring *l* being elongated slightly beyond shank *k* for this purpose,) when the handle G may be reversed until the tooth *m* engages with the notch *e* on the opposite side of stem D.

The advantages of my invention will be readily understood from the foregoing description: The handle G, after one pair of cutting-edges is worn dull, may be easily and simply reversed, thus throwing the reserve pair of cutting-edges into operation, thus making repairs less frequently necessary than with scissors of the ordinary construction.

Having thus described my invention, I claim and desire to secure by Letters Patent of the United States—

The combination, in a pair of scissors or shears, provided with double cutting-edges *a a' b b'*, of the blade B, having round stem D, with the reversible handle G, having perforated shank *k* and spring *l*, having tooth in the latter, passing through perforation *n* in shank *k*, and fitting into notches *e* in stem D, all substantially as and for the purpose herein shown and specified.

In testimony that I claim the foregoing as my own I have hereto affixed my signature in presence of two witnesses.

THOMAS ADAMS KELLY.

Witnesses:
WILLIAM NATHAN MOLTON,
THOMAS PINKNEY KELLEY.